(12) United States Patent
Carter et al.

(10) Patent No.: US 8,423,574 B2
(45) Date of Patent: Apr. 16, 2013

(54) METHOD AND SYSTEM FOR MANAGING TAGS

(75) Inventors: Bernadette A. Carter, Cary, NC (US); Belinda Y. Chang, Cary, NC (US); Fuyi Li, Sudbury, MA (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/187,053

(22) Filed: Aug. 6, 2008

(65) Prior Publication Data

US 2010/0036888 A1    Feb. 11, 2010

(51) Int. Cl.
*G06F 7/00* (2006.01)
*G06F 17/30* (2006.01)

(52) U.S. Cl.
USPC .......................... 707/791; 707/793; 707/796

(58) Field of Classification Search .................. None
See application file for complete search history.

(56) References Cited

U.S. PATENT DOCUMENTS

| | | | | |
|---|---|---|---|---|
| 6,385,644 B1* | 5/2002 | Devine et al. | | 709/206 |
| 6,681,298 B1* | 1/2004 | Tso et al. | | 711/133 |
| 6,954,783 B1* | 10/2005 | Bodwell et al. | | 709/218 |
| 7,151,920 B2* | 12/2006 | Eiden et al. | | 455/403 |
| 7,870,135 B1* | 1/2011 | Cheung | | 707/737 |
| 2002/0038367 A1* | 3/2002 | Inoue | | 709/225 |
| 2002/0059230 A1* | 5/2002 | Hunepohl et al. | | 707/6 |
| 2004/0230552 A1* | 11/2004 | Smith et al. | | 707/1 |
| 2004/0249871 A1* | 12/2004 | Bazoon | | 707/206 |
| 2006/0010096 A1* | 1/2006 | Crossland et al. | | 707/1 |
| 2006/0010169 A1* | 1/2006 | Kitamura | | 707/200 |
| 2006/0047730 A1* | 3/2006 | Hibino et al. | | 707/205 |
| 2006/0190561 A1* | 8/2006 | Conboy et al. | | 709/217 |
| 2006/0218266 A1* | 9/2006 | Matsumoto et al. | | 709/224 |
| 2007/0121651 A1* | 5/2007 | Casey et al. | | 370/401 |
| 2007/0136252 A1* | 6/2007 | Teare et al. | | 707/3 |
| 2007/0150517 A1* | 6/2007 | Malone | | 707/104.1 |
| 2007/0154115 A1* | 7/2007 | Yoo | | 382/305 |
| 2007/0232223 A1* | 10/2007 | Bilange | | 455/3.06 |
| 2008/0001752 A1* | 1/2008 | Bruns et al. | | 340/572.1 |
| 2009/0077062 A1* | 3/2009 | Spivack et al. | | 707/5 |
| 2009/0112715 A1* | 4/2009 | Steelberg et al. | | 705/14 |
| 2009/0177704 A1* | 7/2009 | Consul et al. | | 707/200 |
| 2010/0050090 A1* | 2/2010 | Leebow | | 715/751 |

* cited by examiner

*Primary Examiner* — Jay Morrison
(74) *Attorney, Agent, or Firm* — Jeffrey T. Holman

(57) ABSTRACT

A method and system manage one or more tags for an item. The tags reside in a datastore. The method and system include associating the tag with at least one expiration condition and determining whether the at least one expiration condition has been met. If the expiration condition(s) have been met, then corrective action is taken for the tag while retaining the at least one item.

17 Claims, 2 Drawing Sheets

METHOD AND SYSTEM FOR MANAGING TAGS

BACKGROUND OF THE INVENTION

A tag is metadata associated with an item, such as a digital image or bookmark. The tag is typically a character string, or keyword. Tags for an item may be generated in any number of ways. One or more users may enter the tag using a keyboard or similar mechanism or may select the tag from a list. For example, on an image sharing website, multiple users may enter tags that they may believe are descriptive of a particular image. Alternatively, tag(s) may be preset by an entity. For example, an image or bookmark might be provided with a name, or tag, by the user who captured the image or the entity maintaining the website. In some instances, an item may have a number of tags entered by the same or different users.

Tags may be used in organizing and/or utilizing the items to which the tags correspond. In a collection of digital images, for example, each image may have one or more tags. These tags may be provided by users and may be descriptive of the image. When a user wishes to view certain images, they enter keywords into the search engine. The keywords are those the user believes would be associated with an image. The search engine searches an archive of tags for matches to the keywords entered by the user. If any matches are found, the images corresponding to the tags are provided to the user.

Although tags are useful, there are drawbacks. Over time, each item may be associated with a large number of tags. Some of the tags are used only sporadically in organizing or utilizing the items. As a result, the tags or the items themselves may become stale. For a large collection of items, many of which may have a large number of seldom or unused tags, storage of stale information may be particularly undesirable. Some conventional mechanisms for managing information remove items, such as bookmarks, which have expired. However, better management of the tags and items is still desired. In addition, there is often no requirement that a tag entered by a user actually be descriptive of the item. For example, in a collection of images available to multiple users, the users are often unconstrained in their selection of a tag. Consequently, tags that are not descriptive or even misdescriptive of the item may be added. As a result, organization of or searches for items using such a tag may provide unexpected or ineffective results. As a result, improved management of items and the tags corresponding to the items is still desired.

BRIEF SUMMARY OF THE INVENTION

A method and system which manage a tag for an item. In one aspect, the method and system include setting at least one expiration condition for the tag and determining whether the at least one expiration condition has been met. If the expiration condition(s) have been met, then corrective action is taken for the tag while the item is retained on the system. In another aspect, the system includes a datastore that stores the item, the tag, and at least one expiration condition for the tag. In this aspect, the system also includes a tag management system. The tag management system associates the tag with the expiration condition(s), determines whether the expiration condition(s) have been met, and takes corrective action for the tag while retaining the item if the at least one expiration condition has been met.

DETAILED DESCRIPTION OF THE INVENTION

Figure 1:
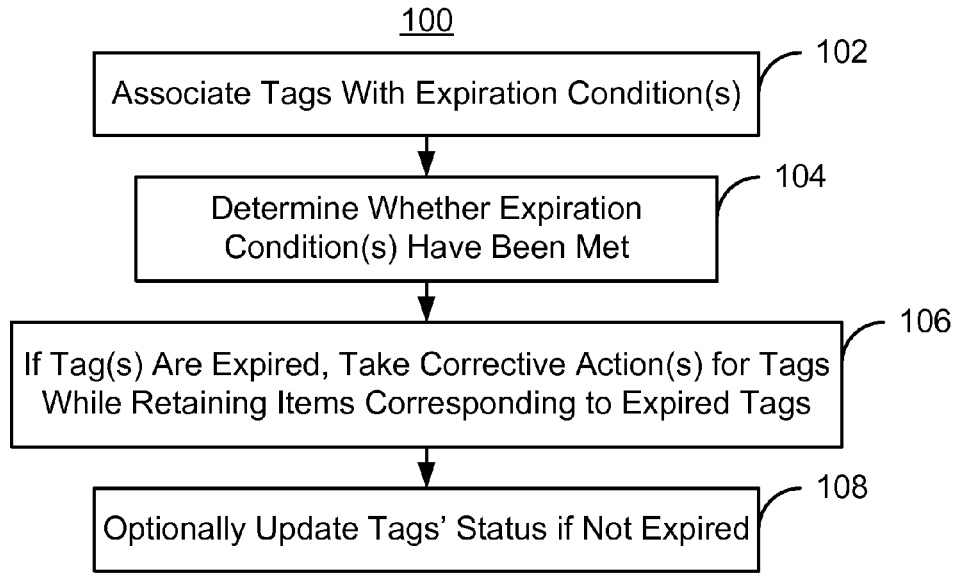
FIG. 1 is a flow chart of an exemplary embodiment of a method for managing tags.

The method and system relate to management of tags. The following description is presented to enable one of ordinary skill in the art to make and use the invention and is provided in the context of a patent application and its requirements. Various modifications to the embodiments and the generic principles and features described herein will be readily apparent to those skilled in the art. Thus, the method and system are not intended to be limited to the embodiments shown, but is to be accorded the widest scope consistent with the principles and features described herein.

The method and system are mainly described in terms of particular systems provided in particular implementations. However, one of ordinary skill in the art will readily recognize that this method and system will operate effectively in other implementations. For example, the systems, devices, and networks usable with the present invention can take a number of different forms. The method and system will also be described in the context of particular methods having certain steps. However, the method and system operate effectively for other methods having different and/or additional steps not inconsistent with the method and system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A method and system which manages one or more tags for an item. In one aspect, the method and system include setting at least one expiration condition for the tag and determining whether the at least one expiration condition has been met. If the expiration condition(s) have been met, then corrective action is taken for the tag while the item is retained on the system. In another aspect, the system includes a datastore that stores the item, the tag, and at least one expiration condition for the tag. In this aspect, the system also includes a tag management system. The tag management system associates the tag with the expiration condition(s), determines whether the expiration condition(s) have been met, and takes corrective action for the tag while retaining the item if the at least one expiration condition has been met.

FIG. 1 is a flow chart of an exemplary embodiment of a computer-implemented method 100 for managing tags for one or more items. In one embodiment, the method 100 may be implemented by a user's own system, for example a desktop system. In another embodiment, the method 100 may be implemented using a remote computer system, for example a server, which users access through a network such as the Internet. The method 100 is described in the context of tags. However, the tags could be part of a larger tag. Thus, if a tag is considered to be a character string, the method 100 may be implemented for a subset of the character string. For example, the method 100 might be used for the tag, or character string, "dog" when the tag actually associated with the item is "dogs".

The tags are associated with one or more expiration conditions, via step 102. An expiration condition is a measure of time and/or use of the tag. For example, the expiration condition for a tag may be a specific physical time such as four months, or a number of uses such as a number of searches. Thus, the expiration conditions could include a minimum number of uses over a time interval or a maximum time since the last use. The expiration conditions might also include whether the user(s) who provided the tags have logged on or otherwise accessed the system within a particular time. The expiration conditions could include any number of these conditions (including all) and/or other expiration conditions deemed appropriate. In one embodiment, the expiration conditions are set for all tags. In another embodiment, only a subset of tags has expiration conditions. In addition, a particular tag may have one or more expiration conditions. Further, the same expiration condition may be set for all or a subset of the tags. In one embodiment, step 102 is performed when the tag is received. In another embodiment, step 102 may be performed at a later time. Step 102 may also include resetting or otherwise modifying expiration conditions for the tag(s). Thus, step 102 may be performed multiple times, allowing expiration conditions for the tags may be updated after the initial association.

Step 102 may also include customizing the expiration conditions for particular tags and/or items. For example, new tags for an item may be compared to pre-existing tags for the item. If the new tag is similar to the pre-existing tags, then the expiration conditions are set normally, as for other tags for the item. If the new tag is different from the remaining tags, then the expiration conditions may be set in a different manner. For example, if the new tag is an antonym for one or more of the preexisting tags, then the expiration conditions may be set such that the tag is more likely to expire. If the new tag is not an antonym, then the expiration conditions may be set as for one or more of the pre-existing tags. In addition, step 102 may also include setting corrective actions in the event that the tags expire. Thus, not only the expiration conditions, but also the corrective action taken may be tailored. In one embodiment, the expiration conditions are set automatically. However, in another embodiment, a user may be allowed to manually specify expiration conditions.

The method 100 determines whether expiration conditions for the tags have been met, via step 104. In one embodiment, step 102 may be performed once for each tag. However, in another embodiment, step 102 may be performed multiple times. Step 104 may also be performed multiple times throughout use of the tags. For physical time, step 104 may include determining an elapsed time since the last use and comparing the elapsed time to the maximum time interval. In another embodiment, upon last use, the maximum time interval may be added to the time of last use to provide an expiration time. Step 104 may then compare the current time to the expiration time to determine whether the expiration time has been reached. If the expiration condition includes a minimum number of uses, then step 104 may include counting the number of uses of each tag during a time interval and comparing the number of uses with the minimum number of uses. Based on these comparisons, it can be determined whether the expiration conditions have been met.

If the expiration conditions have been met for particular tags, then corrective action is taken for the tags, via step 106. Throughout this corrective action, the corresponding item(s) are retained. For example, corrective action may include removing from the datastore the tags for which the expiration conditions have been met. Although the tags are removed, the corresponding items remain in the datastore. Thus, the correspondence between the items and the expired tags is eliminated. Stated differently the expired tags are disassociated from their items. In another embodiment, the corrective action could also include displaying the prompt for a user. The prompt may indicate that the tags have expired and are to be removed from the datastore as long as the user approves/does not disapprove the removal. If the user approves/does not disapprove, then the tags are removed from the datastore. However, in this case the items still remain. Thus, again, the correspondence between the expired tags and the items is broken. The corrective action might also include replacing the tags for example with default tags, marking the tags as obsolete or otherwise breaking the correspondence between the expired tags and the items. However, in such an embodiment, the item still remains.

If the expiration conditions have not been met, then the tag(s) are not expired. Consequently, the tag status may optionally be updated, via step 108. In one embodiment, step 108 may include resetting a time of last use, a number of uses, or other measures from which the expiration conditions are judged. Step 108 might also include allowing the expiration conditions to be changed for tags that remain unexpired, for example by repeating step 102.

Using the method 100, tags may be better managed. In particular, tags that are seldom used or which have not been used in a particular amount of time may be removed without removing the items to which the tags correspond. As a result, tags that may not be of interest, may not describe the corresponding item, or which have expired for some other reason may be eliminated without adversely affecting the range of items available to users.

Figure 2:
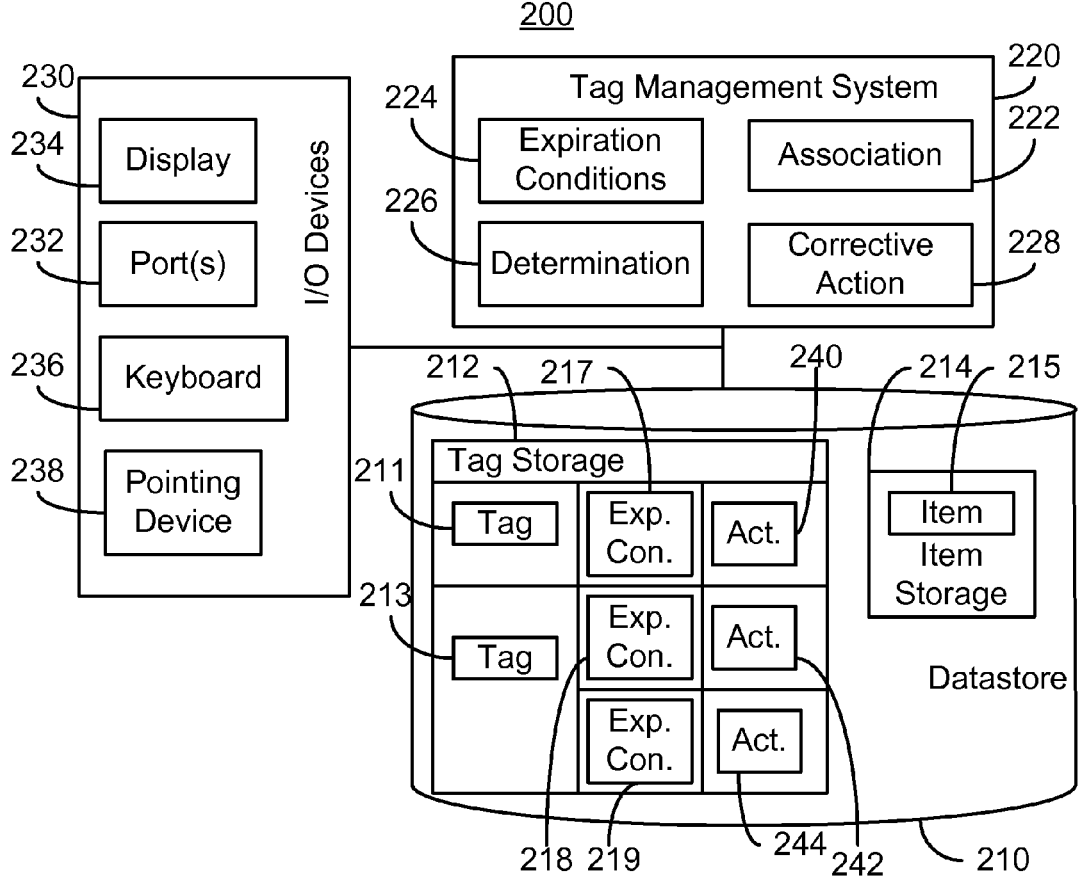
FIG. 2 is a block diagram of an exemplary embodiment of a system used in managing tags.

FIG. 2 is a block diagram of an exemplary embodiment of a system 200 used in managing tags. The system 200 includes a datastore 210 and a tag management system 220. Also shown are input/output (I/O) devices 230. The I/O devices may include ports 232, display(s) 234, keyboard 236, pointing device 238 and/or other mechanisms for providing input to and receiving output from the system 200. For example, port 232 may be used to provide I/O if the system 200 is remotely accessed by the user, for example via the Internet. The user may then view content on the display(s) of their own system and provide input through their own keyboard and/or pointing device. Further, although I/O devices 232, 234, 236 and 238 are all shown, one or more devices 232, 234, 236, and 238 may be omitted or replaced.

The datastore 210 may include one or more memories. The datastore 210 includes a tag storage 212 and item storage 214. For clarity, the tag storage 212 and item storage 214 are depicted together. However, in another embodiment, the tag storage 212 and item storage 214 may be physically separate. In one embodiment, tag storage 212 may be a dictionary or other database through which each tag is correlated to one or more items. For simplicity, only tags 211 and 213 and item 215 are shown as residing in the datastore 210. Expiration conditions 217, 218 and 219 are shown as residing in the datastore 210 with the tags 215 and 216. However, in another embodiment, the expiration conditions 217, 218 and 219 may be stored elsewhere. Further, although each tag 211 and 213 is shown as having at least one expiration condition 217 and 218-219, in one embodiment, one or more tags may not have any expiration conditions. Corrective action 240, 242, and 244 for each tag 211 and 213, as well as each expiration condition 217-219 may also reside in the datastore 210. However, in another embodiment, the corrective action 240, 242, and 244 may reside elsewhere. Further, the corrective action 240, 242, and 244 may be the same or may differ, for example based upon the tags 211 and 213 and/or the expiration conditions 217, 218, and 219.

The tag management system 220 may be used in implementing the method 100. In the embodiment shown, the tag management system 220 includes association block 222, expiration condition block 224, determination block 226, and corrective action block 228. In one embodiment, expiration condition block 224 determines the expiration conditions for the tags as well as the corrective action that is to be taken if the expiration conditions are met. Association block 222 associates the expiration conditions with the corresponding tags. Determination block 226 determines whether the expiration conditions for the tags have been met. Corrective action block 228 takes the appropriate action if the expiration conditions are met. However, in another embodiment, the functions performed by the blocks 222, 224, 226, and 228 are not separated into distinct logical blocks.

Figure 3:
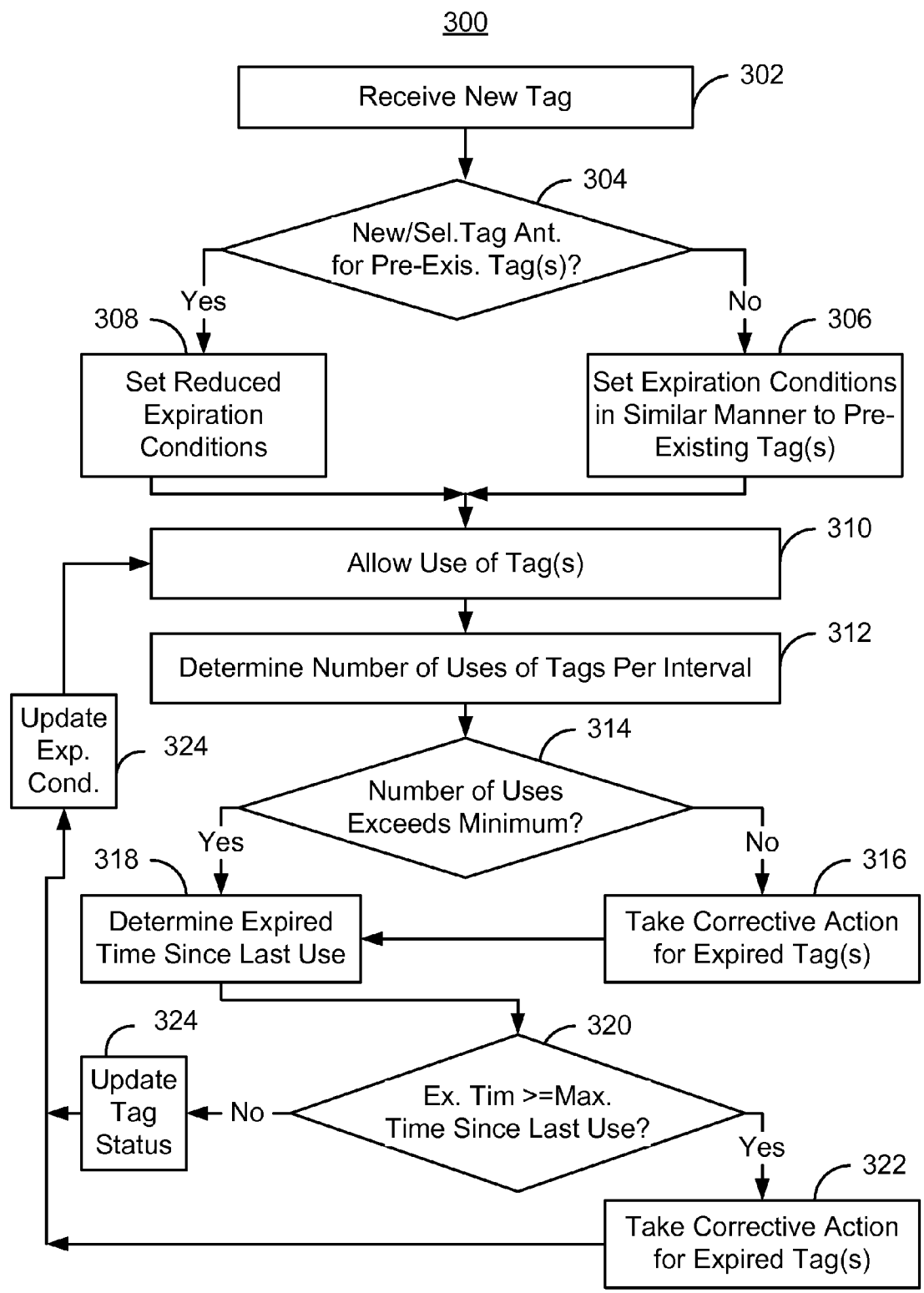
FIG. 3 is a flow chart of another exemplary embodiment of a method for managing tags.

FIG. 3 is a flow chart of another exemplary embodiment of a method 300 for managing tags. The method 300 is described in the context of the system 200. Referring to FIGS. 2-3, the method 300 is described in the context of tags 211 and 213. However, the tags 211 and 213 could be part of a larger tag. Thus, if a tag 211 and 213 is considered to be a character string, the method 300 may be implemented for a subset of the character string. Further, the method A new tag 213 is received by the system 200, via step 302. In one embodiment, step 302 could include the user inputting the tag 213 for the item 215 via the keyboard 236 or selecting the tag 213 from a list using the pointing device 238. In another embodiment the tag 213 may be received via the ports 232. The tag 213 is compared with pre-existing tag 211, via step 304. Step 304 may be performed by expiration condition 224.

If the tag 211 is not an antonym for the tag 213, then expiration condition(s) 218 and 219 are set for the tag 213 in a manner analogous to setting of the expiration condition 217 for the tag 211, via step 306. Step 306 may be performed by the association block 222 and expiration condition block 224. For example, the expiration condition block 224 may determine the conditions 218 and 219 while the association block 22 may store the tag 213 and associated conditions 218 and 219 in the datastore 210. The expiration conditions set in step 306 also include at least one of a maximum time interval since a last use and a minimum number of users per time interval. Thus, the expiration conditions set in step 306 may include both physical time and another measure of use of the tag 213. The expiration conditions 218 or 219 set in step 306 may be the same or different from the expiration condition 217. For example, expiration condition 217 may be a particular maximum time since last use such as four months. Expiration condition 218 for tag 213 may also be set as four months and/or the same heuristic for determining the maximum time may be used. In one embodiment, it is not required that the same heuristic result in the same number. For example, suppose the heuristic sets the maximum time based on the number of users selecting the tag 211 or 213. Also suppose that two users selected the tag 211, while only one selected the tag 213. The same heuristic may then result in a larger maximum time being set for the expiration condition 217 than for the expiration condition 218. Step 306 may also include setting additional and/or fewer expiration conditions than for the pre-existing tag 211. Thus, the tag 213 may have expiration conditions 218 and 219 while the tag 211 has only one expiration condition 217. For example, suppose that the expiration condition 217 is a maximum time interval since last use of the tag 211. The expiration condition 218 may also be a maximum time interval since the last use of the tag 213. The expiration condition 219 may be different. For example, the expiration condition 219 may be a minimum number of uses over a time interval. Further, step 306 may set corrective action 242 and 244.

If the tag 213 is an antonym of the tag 211, then reduced expiration conditions are set for the tag 213, via step 308. A reduced expiration condition is one which will result in the tag 213 expiring more quickly. Step 308 may be performed by the association block 222 and expiration condition block 224. For example, the expiration condition block 224 may determine the conditions 218 and 219 while the association block 222 may store the tag 213 and associated conditions 218 and 219 in the datastore 210. In one embodiment, step 308 uses the same heuristic as for step 306, then modifies the final output. If the maximum time would have been set in step 306, then step 308 reduces this time by a particular amount. For example, if four months would have been set as the maximum time without use in step 306, then step 308 may reduce the time by a preset or customized amount, such as one month. If a minimum number of uses per time interval is set in step 306, then step 308 may increase this by a particular amount. For example, if one hundred uses per month would have been set in step 306, then step 308 may set the minimum number of uses to one hundred and twenty. Thus, steps 306 and 308 associate the tag 213 with expiration conditions 218 and 219. Step 308 may also set the corrective action 242 and 244. For the ensuing discussion, it is assumed that the expiration condition 217 and 218 correspond to maximum time(s) since last use and the expiration condition 219 corresponds to a minimum number of uses per time interval regardless of whether the expiration conditions 217, 218 and 219 were set in step 306 or step 308.

Users are allowed to utilize the tags 211 and 213, via step 310. Although depicted as a single step, the users may be allowed to use the tags 211 and 213 throughout the method 300. The number of uses for the tag 213 per interval is determined, via step 312. In one embodiment, step 312 is determined at the end of each interval. In another embodiment, step 312 may be determined at other times. It is determined whether the number of uses for the tag 213 exceeds the minimum number of uses set in step 306/308, via step 314. Stated differently, step 314 determines whether the expiration condition 219 has been met. Steps 312 and 314 may be performed by determination block 226.

If the expiration condition 219 has been met, then the tag is expired and corrective action 244 is taken, via step 316. Step 316 may be performed by corrective action block 228. The corrective action 244 taken in step 316 may include removal of the tag 213 while the item 215 is retained or displaying a prompt to the user, for example on the display 234. If the user approves/does not disapprove the removal after the prompt is displayed, then the tag 213 may be removed in step 316.

The amount of time expired since the last uses of the tags 211 and 213 (if not determined to be expired in step 314) are determined, via step 318. In one embodiment, step 318 simply calculates the time interval since the last use of each tag 211 and 213. In another embodiment, step 318 may simply track the current time. It is determined whether the time expired meets and/or exceeds the maximum time set for each of expiration conditions 217 and 219, via step 320. For example, step 320 may compare the current time to the time (s) of last use plus the maximum time interval(s) for the tags 211 and/or 213. In another embodiment, step 320 may compare the time interval(s) to the maximum time(s) since last use for tags 211 and 213. Thus, step 320 determines whether any of the expiration conditions 217 and 218 have been met. Steps 318 and 320 may be performed using determination block 226.

If it is determined that the time expired exceeds the time interval since the last use for any tag 211 or 213, then the tag 211 and/or 213 is expired and corrective action 240 or 244 is taken, via step 322. Step 322 may be performed using corrective action block 228. The corrective action taken in step 322 may include removal of the tag 211 and/or 213 while the item 215 is retained or displaying a prompt to the user, for example on the display 234. If the user approves/does not disapprove the removal after the prompt is displayed, then the tag 211 and/or 213 may be removed in step 322. If the tag is not determined to be expired in step 314 or 320, then the status of the tag may be updated in step 314. Although shown as occurring after step 320, in one embodiment, the tag status is updated upon each use or other event that might result in the expiration condition not being met. The expiration conditions may be optionally updated in step 326. In one embodiment, step 326 is analogous to steps 304, 306, and 308. However, in another embodiment, the expiration condition(s) may be set in another manner. In addition, although step 326 is shown occurring after particular steps in the method 300, the expiration conditions may be allowed to be updated at various times. The user may then be allowed to use remaining tags in step 310.

Using the method 300, tags 211 and 213 may be better managed. In particular, if a tag 211 and/or 213 has not been used enough or not been used in a long enough time, then the tag 211 and/or 213 may be removed without removing the item 215. As a result, tags 211 and/or 213 that may not be of interest, may not describe the corresponding item, or which have expired for some other reason may be eliminated without adversely affecting the availability of the item 215.

A method and system for managing tags has been disclosed. The method and system have been described in accordance with the embodiments shown, and one of ordinary skill in the art will readily recognize that there could be variations to the embodiments, and any variations would be within the spirit and scope of the present application. For example, the method and system can be implemented using hardware, software, a computer readable medium containing program instructions, or a combination thereof. Software written according to the present invention may be stored in some form of computer-readable medium, such as memory or CD-ROM, and executed by a processor. Accordingly, many modifications may be made by one of ordinary skill in the art without departing from the spirit and scope of the appended claims.

We claim:

1. A computer-implemented method for managing a tag for an item, the tag residing in a datastore, the method comprising:
    associating the tag with at least one expiration condition, wherein the at least one expiration condition is a condition for expiration of the tag, the at least one expiration condition comprising expiring the tag in response to not reaching a minimum number of uses of the tag within a time interval, wherein the minimum number of uses is a quantity, wherein the quantity is two or more;
    determining a number of uses of the tag within the time interval;
    comparing the minimum number of uses to the number of uses; and
    taking corrective action on the tag while retaining the item, wherein the taking of corrective action and the retaining of the item are in response to the number of uses being less than the minimum number of uses.

2. The method of claim 1 wherein the corrective action comprises:
    displaying the prompt for a user to approve the removal of the tag from the datastore; and
    removing the tag from the datastore in response to the user approving the removal.

3. The method of claim 1 wherein the corrective action comprises at least one of:
    removal of the tag from the datastore while retaining the item, replacement of the tag with a default tag while retaining the item, or marking the tag as obsolete while retaining the item.

4. The method of claim 1 wherein the at least one expiration condition associating further comprises:
    setting the minimum number of uses of the tag.

5. The method of claim 4 wherein the comparing comprises:
    determining whether the minimum number of uses has been reached; and
    in response to the minimum number of uses being reached, determining that the at least one expiration condition has been met.

6. The method of claim 1 wherein the item comprises at least one additional tag and wherein the at least one expiration condition associating further comprises:
    comparing the tag to the at least one additional tag; and
    setting the at least one expiration condition based on the comparing.

7. The method of claim 6 wherein the tag comparing further comprises:
    determining whether the tag is an antonym for any of the at least one additional tag; and
    wherein the at least one expiration condition setting further comprises setting the at least one expiration condition to a reduced number of uses in response to the tag being the antonym for any of the at least one additional tag.

8. The method of claim 1 wherein the tag comprises a character string.

9. The method of claim 1 wherein the tag is a portion of a larger tag.

10. The method of claim 1 further comprising:
resetting a tag status in response to the at least one expiration condition not being met.

11. A computer-implemented method for managing a tag for an item, the tag residing in a datastore, the item corresponding to at least one additional tag, the method comprising:
performing a comparison of the tag to the at least one additional tag;
setting at least one expiration condition of the tag based on the comparison, wherein the at least one expiration condition is a condition for expiration of the tag, the at least one expiration condition comprising expiring the tag in response to not reaching a minimum number of uses of the tag within a time interval, wherein the minimum number of uses is a quantity, wherein the quantity is two or more;
determining a number of uses of the tag within the time interval;
comparing the minimum number of uses to the number of uses; and
removing the tag from the datastore while retaining the item, wherein the removal of the tag and the retaining of the item are in response to the number of uses being less than the minimum number of uses.

12. A system for managing a tag associated with an item comprising:
a datastore for storing the item, the tag, and at least one expiration condition of the tag; and
a tag management system for:
associating the tag with the at least one expiration condition, wherein the at least one expiration condition is a condition for expiration of the tag, the at least one expiration condition comprising expiring the tag in response to not reaching a minimum number of uses of the tag within a time interval, wherein the minimum number of uses is a quantity of two or more;
determining a number of uses of the tag within the time interval;
comparing the minimum number of uses to the number of uses; and
taking corrective action on the tag while retaining the item, wherein the taking of corrective action and the retaining of the item are in response to the number of uses being less than the minimum number of uses.

13. The system of claim 12 wherein the corrective action comprises displaying the prompt for a user to approve the removal of the tag from the datastore and removing the tag from the datastore while retaining the item in response to the user approving the removal.

14. The system of claim 12 wherein the corrective action comprises removal of the tag from the datastore while retaining the item.

15. A computer program product comprising a computer-readable storage device having a computer readable program, wherein the computer readable program when executed on a processor within a computer causes the computer to perform operations, the operations comprising:
associate at least one expiration condition for a tag corresponding to an item, wherein the at least one expiration condition is a condition for expiration of the tag, the tag residing in a datastore, the at least one expiration condition comprising expiring the tag in response to not reaching a minimum number of uses of the tag within a time interval, wherein the minimum number of uses is a quantity, wherein the quantity is two or more;
determine a number of uses of the tag within the time interval;
compare the minimum number of uses to the number of uses; and
take corrective action on the tag while retaining the item, wherein the taking of corrective action and the retaining of the item are in response to the number of uses being less than the minimum number of uses, the corrective action comprising at least one of removal of the tag from the datastore while retaining the at least one item or displaying a prompt to a user for the removal of the tag.

16. A system comprising:
means for associating a tag with at least one expiration condition, wherein the at least one expiration condition is a condition for expiration of the tag, the at least one expiration condition comprising expiring the tag in response to not reaching a minimum number of uses of the tag within a time interval, wherein the minimum number of uses is a quantity, wherein the quantity is two or more;
means for determining a number of uses of the tag within the time interval;
means for comparing the minimum number of uses to the number of uses; and
means for taking corrective action on the tag while retaining the item, wherein the taking of corrective action and the retaining of the item are in response to the number of uses being less than the minimum number of uses.

17. The method of claim 1 wherein the corrective action includes updating the expiration condition in response to a new use of the tag.

* * * * *